United States Patent
Chen et al.

(10) Patent No.: US 6,353,593 B1
(45) Date of Patent: Mar. 5, 2002

(54) PROTECTION ARCHITECTURE FOR VIRTUAL CHANNEL CONNECTIONS (VCCS) IN A TELECOMMUNICATIONS NETWORK

(75) Inventors: David X. Chen, Plano; Ted D. Chang; Rupert R. Zhu, both of Richardson; Edward Y. Qian, Plano, all of TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/325,495

(22) Filed: Jun. 3, 1999

(51) Int. Cl.$^7$ ................................ H04J 1/16; H04J 3/14
(52) U.S. Cl. ..................... 370/216; 370/218; 370/228
(58) Field of Search ........................... 370/216–218, 370/241, 242, 244, 248, 395; 714/100, 1, 2, 3

(56) References Cited

U.S. PATENT DOCUMENTS

| | | | |
|---|---|---|---|
| 4,339,633 A | 7/1982 | Ahmed | 179/99 M |
| 4,631,641 A | 12/1986 | Brombal et al. | 361/424 |
| 5,412,652 A | 5/1995 | Lu | 370/85.12 |
| 5,467,348 A | 11/1995 | Fujii et al. | 370/60.1 |
| 5,838,924 A | * 11/1998 | Anderson et al. | 370/352 |
| 5,870,382 A | * 2/1999 | Tounai et al. | 370/220 |
| 5,974,046 A | * 10/1999 | Kim et al. | 370/395 |
| 6,147,972 A | * 11/2000 | Onishi et al. | 370/248 |
| 6,167,025 A | * 12/2000 | Hsing et al. | 370/216 |

FOREIGN PATENT DOCUMENTS

| | | |
|---|---|---|
| EP | 0 824 292 A2 | 2/1998 |
| WO | WO 99/11090 | 3/1999 |

OTHER PUBLICATIONS

McDysan, David E., et al., *ATM Theory and Application.* McGraw–Hill, Inc. ISBN 0–07–060362–6, pp. 365–385, 1994.

Erdengiz, Ali, "ATM Usage Policing and Traffic Shaping," Communications System Design (Jan. 1997).

Dobrowski, George et al., *ATM User–Network Interface Specification, Version 3.1*, The ATM Forum, Sep., 1994.

Cerent 454™ High Speed SONET/SDH Transport System, ALTS trade show, Las Vegas, Nevada on or about Dec., 1998.

"FLM 150 ADM LAN Extension Product Design Specification," Revision 1.1, Internal Design Specification for Product, sheet 6/353–10/353 and 72/353–75/353, Product publicly release on or about Dec., 1998.

"Product Design Specification (PDS) for FLASH–192, Release 1," Internal Design Specification for Product, pp. 1/916; 4–12/9161 315–320/916, Product publicly release on or about Mar., 1999.

"InterNetworking Systems; AnyMedia® Access Products; AnyMedia Access System," http://www.lucent.com/ins/products/anymedia.html, Printed Aug. 10, 2000.

"AnyMedia® Access System," Lucent Technologies, Inc. Marketing Communications, Sep., 1999.

(List continued on next page.)

Primary Examiner—Ajit Patel
(74) Attorney, Agent, or Firm—Baker Botts L.L.P.

(57) ABSTRACT

A method for protecting virtual channel connection (VCC) traffic in a telecommunications system includes receiving a virtual path connection (VPC) at a destination node. The virtual path connection (VPC) is received on each of a working transmission link and a protection transmission link. The virtual path connection (VPC) includes a plurality of virtual channel connections (VCCs) A protection switching status is received for the working and protection transmission links. The virtual channel connections (VCCs) are selected from the working and protection transmission links for processing by selecting the virtual path connection (VPC) from one of the working and protection links based on the protection switching status for at least one of the working and protection transmission links.

20 Claims, 3 Drawing Sheets

OTHER PUBLICATIONS

"The AnyMedia™ Access System Anything's Possible," Lucent Technologies, Inc. Marketing Communications, 1997.

International Search Report in International Application No. PCT/US 00/15338, dated Aug. 31, 2000, 6 pages.

Photography of Northern Telecom Card, card dated Apr., 1998.

Held, G., *Understanding Data Communications*, Fifth Edition, Sams Publishing. ISBN No. 0-672-30934-3, Chapter 14, pp. 419-431, 1996.

McCloghrie, K., et al., "Management Information Base for Network Management of TCP/IP-based internets: MIB-II," SNMP Working Group, Mar., 1991.

"Draft New Recommendation 1.630 (ATM Protection Switching)," ITU Telecommunication Standardization Sector, COM 13-41-E, Sep., 1998.

Guérin, R., et al., "Equivalent Capacity and its Application to Bandwidth Allocation in High-Speed Networks," IEEE Journal on Selected Areas in Communications, vol. 9, No. 7, pp. 968-981, Sep., 1991.

Gün, L., et al., "Bandwidth Management and Congestion Control Framework of the Broadband Network Architecture," Computer Networks and ISDN Systems 26, Elsevier Science Publishers B.V., North-Holland, pp. 61-78, 1993.

"S/DMS TransprtNode 'OC-3 Express'—Cost-Effective SONET Transport for Low-Capacity Applications", Northern Telecom Marketing Publications, Issue 1, pp. 1-31, Sep. 27, 1996.

*Universal Serial Bus Specification Revision 1.1*, Compaq Computer Corporation, Intel Corporation, Microsoft Corporation, NEC Corporation, Sep. 23, 1998.

"MMC Products," http://www.mc-net.com/top-roducts/productdescriptions.html, Printed Jul. 22, 1999.

"MMC Network's Products: AnyFlow 5400," http://www.mmcnet.com/Solutions/anyflow5400.asp, Printed Feb. 7, 2000.

"MMC Network's Products: AnyFlow 5500," http://www.mmcnet.com/Solutions/anyflow5400.asp, Printed Feb. 7, 2000.

"AnyFlow 5400 Product Overview," MMC Networks, Undated.

"AnyFlow 5500 Product Overview," MMC Networks, Undated.

SwitchStAR™ ATM Cell Based 8 X 8 Non-Blocking Single Chip Switching Memory, Preliminary IDT77V400, Commercial Temperature Range, Integrated Device Technology, Inc., pp. 1-23, May, 1998.

SwitchStAR™ ATM Cell Based 8 X 8 Non-Blocking Single Chip Switch Controller, Preliminary IDT77V500, Commercial Temperature Range, Integrated Device Technology, Inc., pp. 1-14, May, 1998.

Giroux, Natalie et al., *Traffic Management Specification, Version 4.0*, af-tm-0056.00, The ATM Forum, Apr., 1996.

*M4 Interface Requirements and Logical MIB*, af-nm-0020.000, The ATM Forum, Oct., 1994.

\* cited by examiner

PROTECTION ARCHITECTURE FOR VIRTUAL CHANNEL CONNECTIONS (VCCS) IN A TELECOMMUNICATIONS NETWORK

TECHNICAL FIELD OF THE INVENTION

This invention relates generally to the field of telecommunications systems, and more particularly to a protection architecture for virtual channel connections (VCCs) in a telecommunications network.

BACKGROUND OF THE INVENTION

Telecommunications networks have traditionally been circuit-switch networks that have transmission paths dedicated to specific users for the duration of a call and that employ continuous, fixed-bandwidth transmission. Due to growth in data traffic created by the Internet and its related technologies, however, core telecommunications networks are being moved to a packet-switching transmission model. Packet-switch networks provide a large range of digital services, from data to video to basic voice telephony. Packet-switch networks can allow dynamic bandwidth and may be connectionless with no dedicated path or connection-oriented with virtual circuits and dedicated bandwidth along a predetermined path.

Asynchronous transfer mode (ATM) is a connection-oriented packet-switching technology in which information is organized into small, fixed length cells. ATM carries data asynchronously, automatically assigning data cells to available time slots on demand to provide maximum throughput. Compared with other network technologies, ATM provides large increases in maximum supported bandwidth, designed-in asynchronous traffic support, support for multiple types of traffic such as data, video, and voice transmissions on shared communication lines, and virtual networking capabilities, which increase bandwidth utilization and ease network administration.

ATM cells are routed through a telecommunications network at high speeds using a switching label included in the cell. The switching label has two sections that define a virtual path (VP) and a virtual channel (VC) in the network through which the cell is routed. The use of virtual paths (VPs) and virtual channels (VCs) allows physical bandwidth in the network to be subdivided into virtual channel connections (VCCs) and separately commercialized.

Within a telecommunications network, virtual channel connections (VCCs) are typically routed along redundant paths to support protection switching at a destination node. As bandwidth in transmission lines is subdivided into an increasing number of virtual channel connections (VCCs), however, protection switching for each of the connections becomes difficult to implement. Previous attempts to manage protection switching have included bundling together virtual channel connections (VCCs) to form a virtual channel group (VCG) In the event of protection switching, all virtual channel connections (VCCS) contained within the group are simultaneously switched. Although this improves efficiency, switching nevertheless remains at the virtual channel connection (VCC) level and is resource intensive.

SUMMARY OF THE INVENTION

The present invention provides a protection architecture for virtual channel connections (VCCs) in a telecommunications network that substantially eliminate or reduce disadvantages and problems associated with previous systems and methods. In particular, virtual channel connections (VCCs) for a protection domain are bundled together into a virtual path connection (VPC) and protection switched at that level in the event of a transmission line failure.

In accordance with one embodiment of the present invention, a method for protecting virtual channel connection (VCC) traffic in a telecommunications system includes receiving a virtual path connection (VPC) at a destination node. The virtual path connection (VPC) is received on each of a working transmission link and a protection transmission link. The virtual path connection (VPC) includes a plurality of virtual channel connections (VCCs). A protection switching status is received for each of the working and protection transmission links. The virtual channel connections (VCCs) are selected from the working and protection transmission links for processing by selecting the virtual path connection (VPC) from one of the working and protection transmission links based on the protection switching status for at least one of the working and protection transmission links.

More specifically, in accordance with a particular embodiment of the present invention, a virtual path group (VPG) is received on each of the working and protection transmission links at the destination node. The virtual path group (VPG) includes the virtual path connection (VPC). The virtual path connection (VPC) is selected from the working and protection transmission links by selecting the virtual path group (VPG) from one of the working and protection transmission links based on the protection switching status for at least one of the working and protection transmission links. In this embodiment, the virtual path group (VPG) may be selected from the protection transmission link in response to receiving an alarm indication signal (AIS) for the working transmission link.

Technical advantages of the present invention include providing an improved protection architecture for virtual channel connections (VCCs) in a telecommunications network. In particular, virtual channel connections (VCCs) are bundled together into a virtual path connection (VPC) that can be protection switched as a unit in response to a transmission line failure. Accordingly, only a single construct needs to be protection switch and pathway selection is simplified at the terminus of the virtual channel connections (VCCs). In addition, configuration and management at intermediate nodes is simplified because many virtual channel connections (VCCs) are tunneled into a single construct and the intermediate nodes see only the construct.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
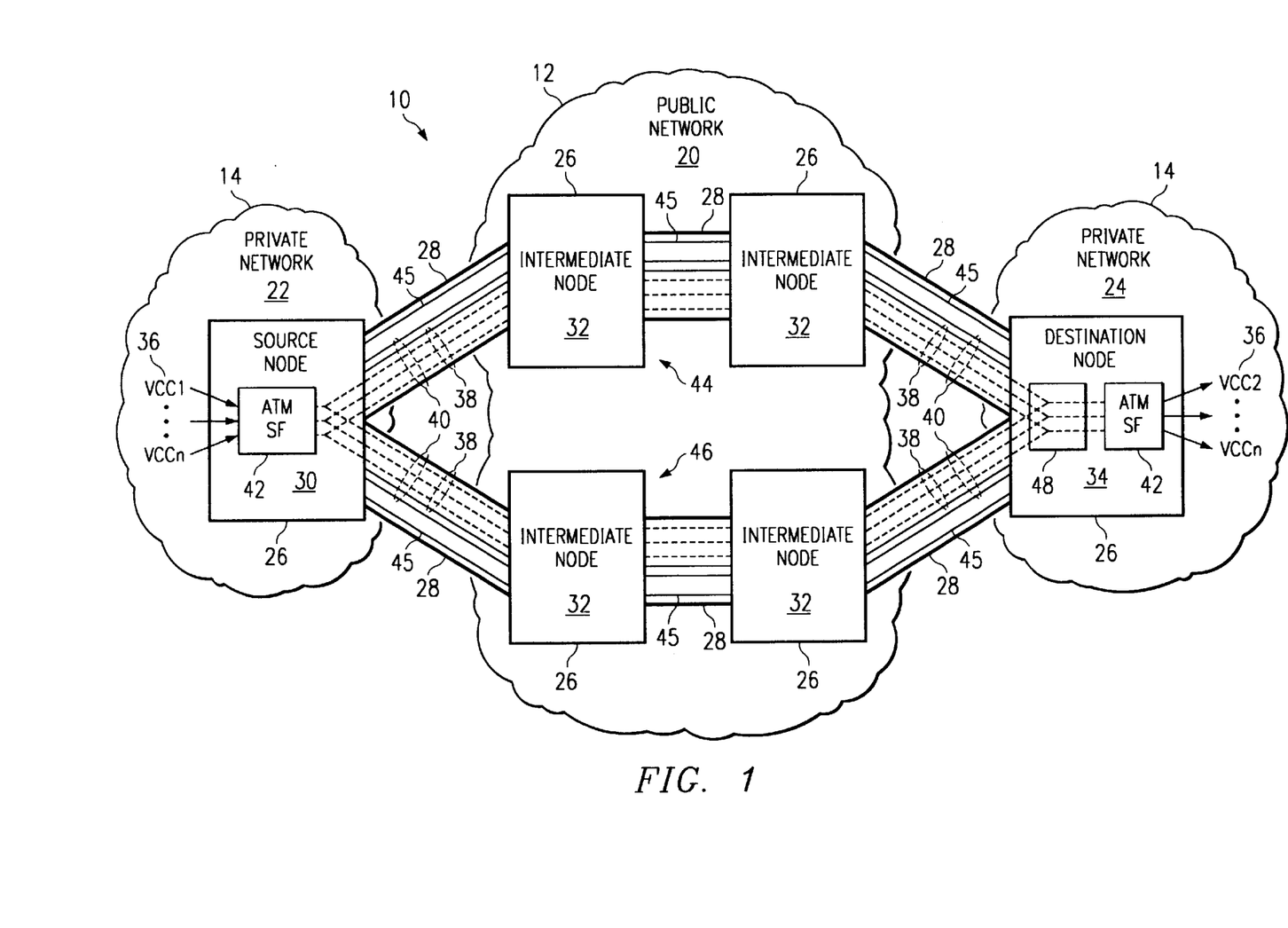
FIG. 1 is a block diagram illustrating a telecommunications system in accordance with one embodiment of the present invention.

FIG. 1 illustrates a telecommunications system 10 in accordance with one embodiment of the present invention. In this embodiment, the telecommunications system 10 comprises a public portion 12 and a private portion 14 that each transmit voice, data, other suitable types of information, and/or a combination of different types of information. The public portion 12 includes a public network 20 such as the Internet. The private portion 14 includes remote private networks 22 and 24. The private networks 22 and 24 are each an Intranet or other suitable network such as a private local area network (LAN) or a private wide area network (WAN). The telecommunications system 10 may be entirely implemented in either the public network 20 or in one of the private networks 22 or 24, or may be otherwise suitably distributed between disparate networks.

Referring to FIG. 1, the telecommunications system 10 includes a plurality of nodes 26 interconnected by transmission lines 28. The nodes 26 each comprise a network element (NE) capable of communicating traffic in the telecommunications system 10. The network element (NE) may be a switch, router, add/drop multiplexer or other suitable device capable of directing traffic in the telecommunications system 10.

The transmission lines 28 provide a physical interface between the nodes 26. Each physical interface is defined by the bandwidth of the connecting transmission line 28 which may be a DS-3 line, an OC-3 line, an OC-12 line, or any other suitable bandwidth. The transmission lines 28 each comprise optical fiber, cable, twisted wire, or other suitable wireline or wireless link capable of transporting traffic between two nodes 26.

For the embodiment of FIG. 1, the telecommunications system 10 includes a source node 30 at a boundary of the private network 22, intermediate nodes 32 within the public network 20, and a destination node 34 at a boundary of the private network 24. The nodes 30, 32, and 34 are each asynchronous transport mode (ATM) elements or multi-protocol elements having functionality for processing ATM traffic in which information is organized into small, fixed length cells. The ATM cells are routed by the nodes 30, 32, and 34, using a switching label included in the cell. The switching label has two sections that define a virtual path (VP) and a virtual channel (VC) in the telecommunications system 10 through which the cell is routed. Use of virtual paths (VPs) and virtual channels (VCs) allows physical bandwidth of the transmission lines 28 to be subdivided into virtual channel connections (VCCs) 36, virtual path connections (VPCs) 38, virtual path groups (VPGs) 40, and the like, and separately commercialized.

The source and destination nodes 30 and 34 each include ATM switch fabric 42 that receives ATM traffic, performs address translation for switching labels in the traffic, and transmits the traffic in accordance with the translated switching labels. For the embodiment of FIG. 1, the ATM switch fabric 42 at the source node 30 receives virtual channel connection (VCC) traffic 36 destined for the destination node 34, translates the address labels in the virtual channel connections (VCCs) to designate a virtual path connection (VPC) 38 extending across a protection domain defined between the source and destination nodes 30 and 34 for the domain, and bridges the virtual path connection (VPC) 38 onto a working transmission link 44 and a protection transmission link 46 extending across the protection domain. The ATM switch fabric 42 may also include the virtual path connection (VPC) 38 by itself or with other traffic in a virtual path group (VPG) 40 defined across the protection domain.

At the destination node 34, a virtual path (VP) selector 48 receives the virtual path connection (VPC) 38 from the working and protection transmission links 44 and 46, selects the virtual channel connections (VCCs) 36 by selecting the virtual path connection (VPC) 38 from one of the links 44 or 46 based on a protection switching status for the links 44 and/or 46. For the embodiment in which the virtual path connection (VPC) 38 is transmitted within the virtual path group (VPG) 40, the virtual path (VP) selector 48 selects the virtual path connection (VPC) 38 by selecting the virtual path group (VPG) 40. The ATM switch fabric 42 at the destination node 34 separates the virtual channel connections (VCCs) received in the virtual path connection (VPC) 42 for individualized routing to destination cards and links.

The protection switching status for the working and protection transmission links 44 and 46 are provided by an automatic protection switching (APS) virtual path connection (VPC) 45 for each of the working and protection transmission links 44 and 46. The working and protection transmission links 44 and 46 may each include only the virtual path connection (VPC) 38, the virtual path connection (VPC) 38 along with its associated automatic protection switching (APS) virtual path connection (VPC) 45 or additional bandwidth. Each automatic protection switching (APS) virtual path connection (VPC) 45 may be bundled with the corresponding virtual path connection (VPC) 38 in the virtual path group (VPG) 40 for transmission on the corresponding working and protection transmission link 44 or 46. As used herein, the term each means every one of at least a subset of the identified items. It will be understood that the protection switching status may be otherwise suitably provided to the destination node 34.

In the destination node 34, the virtual path (VP) selector 48 by default selects the virtual path connection (VPC) 38 received from the working transmission link 44 unless an alarm indication signal (AIS) is received on the automatic protection switching (APS) virtual path connection (VPC) 45 for the working transmission link 44. The alarm indication signal (AIS) may be any suitable type of signal or indication that the corresponding transmission link 44 or 46 has failed, is experiencing problems, may be shut down, has become unreliable, and the like. In response to the alarm indication signal (AIS), the virtual path (VP) selector 48 selects the virtual path connection (VPC) 38 received from the protection transmission link 46 and thereby selects all of the included virtual channel connections (VCC) 36 without individualized processing. In the embodiment in which the virtual path connection (VPC) 38 is transmitted within the virtual path group (VPG) 40, the virtual path (VP) selector 48 responds to the alarm indication signal (AIS) selects the virtual path group (VPG) 40 and thereby selects all included virtual path connections (VPCs) 38 and virtual channel connections (VCCs). Accordingly, protection switching is performed for virtual channel connections (VCCs) 36 at the virtual path connection (VPC) 38 or virtual path group (VPG) 40 level. This eliminates the need to individually protection switch virtual channel connections (VCCs) 36 and reduces resources that need be allocated to protection switching. In addition, the virtual channel connections (VCCs) 36 within the virtual path connection (VPC) 38 tunnel are transparent to the intermediate nodes. This greatly simplifies the provisioning and administration of the intermediate nodes 32.

Figure 2:
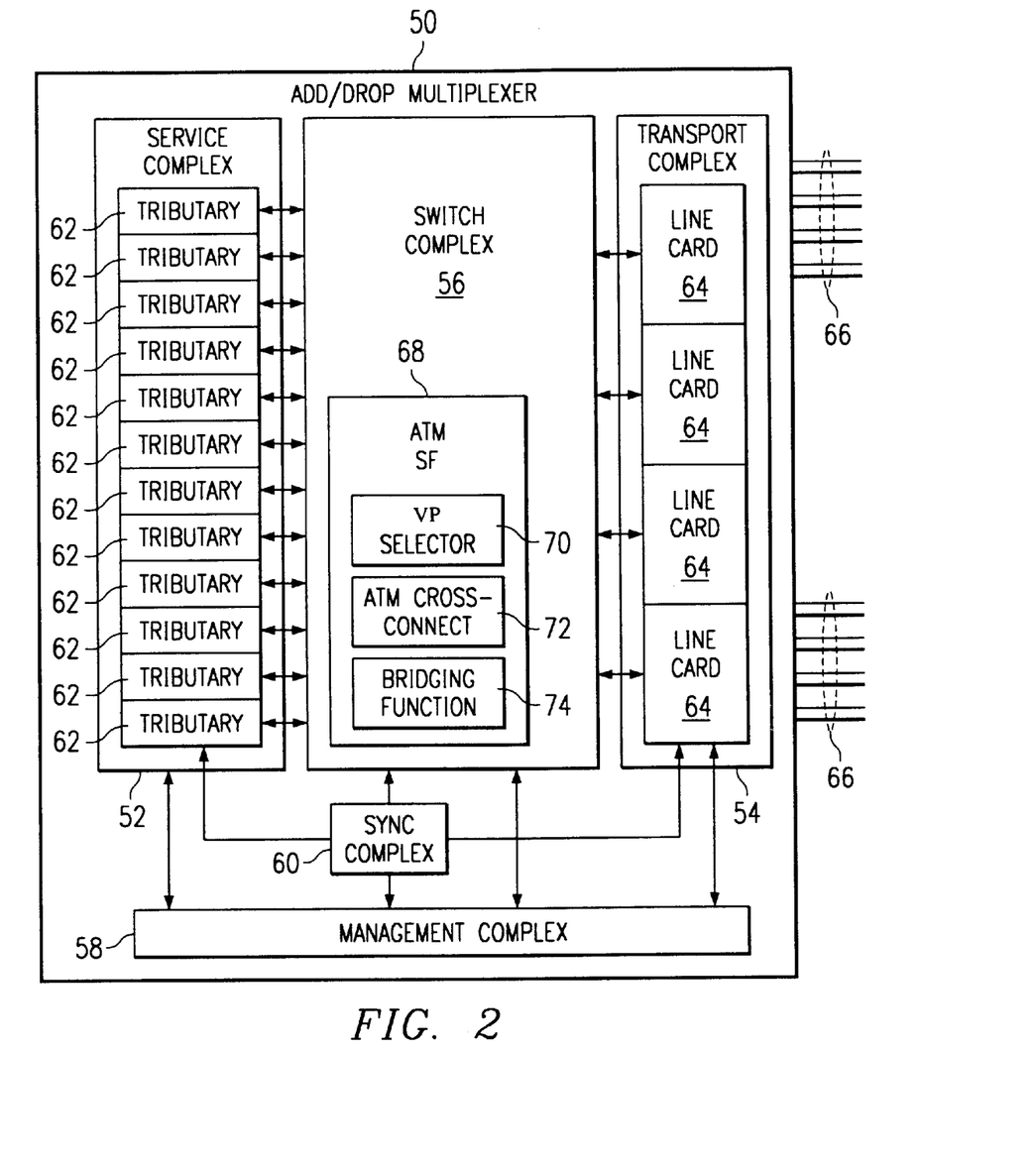
FIG. 2 is a block diagram illustrating an add/drop multiplexer element for the telecommunications system of FIG. 1 in accordance with one embodiment of the present invention.

FIG. 2 illustrates details of the source and destination nodes 30 and 34 in accordance with one embodiment of the present invention. In this embodiment, the nodes 30 and 34 are each a multi-protocol add/drop multiplexer 50. The add/drop multiplexer 50 includes a service complex 52, a transport complex 54, switch complex 56, a management complex 58, and a synchronization complex 60. The disparate complexes 52, 54, 56, 58, and 60 are interconnected by one or more networks or backplanes within the add/drop multiplexer 50.

The service complex 52 includes a plurality of tributary cards 62. The tributary cards 62 each receive customer input/output (I/O) and perform conversions necessary for processing by the switch complex 56.

The transport complex 54 includes a plurality of line cards 64 for transmitting data on the transmission lines 66. In a particular embodiment, the line cards 64 are OC-3 or OC-12 line cards that are bi-directional and can handle optical to electrical (O/E) and electrical to optical (E/O) conversions. In this embodiment, the line cards 64 also handle the line and selection overhead extraction and insertion.

The switch complex 56 includes a plurality of switch fabrics including an ATM switch fabric 68. The ATM switch fabric 68 may include functionality outside the switch complex 56 and is implemented in part by software stored in a computer-readable medium for execution by a processor of the add/drop multiplexer 50. The computer-readable medium is a random access memory (RAM), a read only memory (ROM), or other suitable medium capable of storing programming instructions for execution by the processor.

The ATM switch fabric 68 includes a virtual path (VP) selector 70, ATM cross-connect 72, and bridging function 74. As previously described, the virtual path (VP) selector 70 selects virtual channel connections (VCCs) 36 for processing by the ATM switch fabric 68 by selecting a virtual path connection (VPC) 38 and/or a virtual path group (VPG) 40 including the virtual channel connections (VCCS) 36.

The ATM switch fabric 68 receives ATM cells on an input port and switches them to an output port using an ATM cross-connect 72. In switching the ATM cells, the ATM switch fabric 68 first translates necessary virtual path (VP) and virtual channel (VC) addresses in the switching label of the ATM cells. The bridging function 74 transmits the virtual channel connections (VCCs) 36, virtual path connection (VPC) 38, and/or virtual path group (VPG) 40 onto both the working and protection transmission links 44 and 46. In one embodiment, the bridging function 74 is implemented by a 1:2 multicast within the ATM cross-connect 72. In this embodiment, each virtual path connection (VPC) tunnel is treated as a logical subport and handled by a scheduler on the ATM switch fabric 68.

The management complex 58 monitors and controls the status of the service, transport, switch, and synchronization complexes 52, 54, 56, and 60. The management complex 58 also maintains alarm, protection switching, and provisioning databases for the add/drop multiplexer 50. The synchronization complex 60 synchronizes the service, transport, and switch complexes 52, 54, and 56 by providing a stable traceable reference clock.

Figures 3, 4:
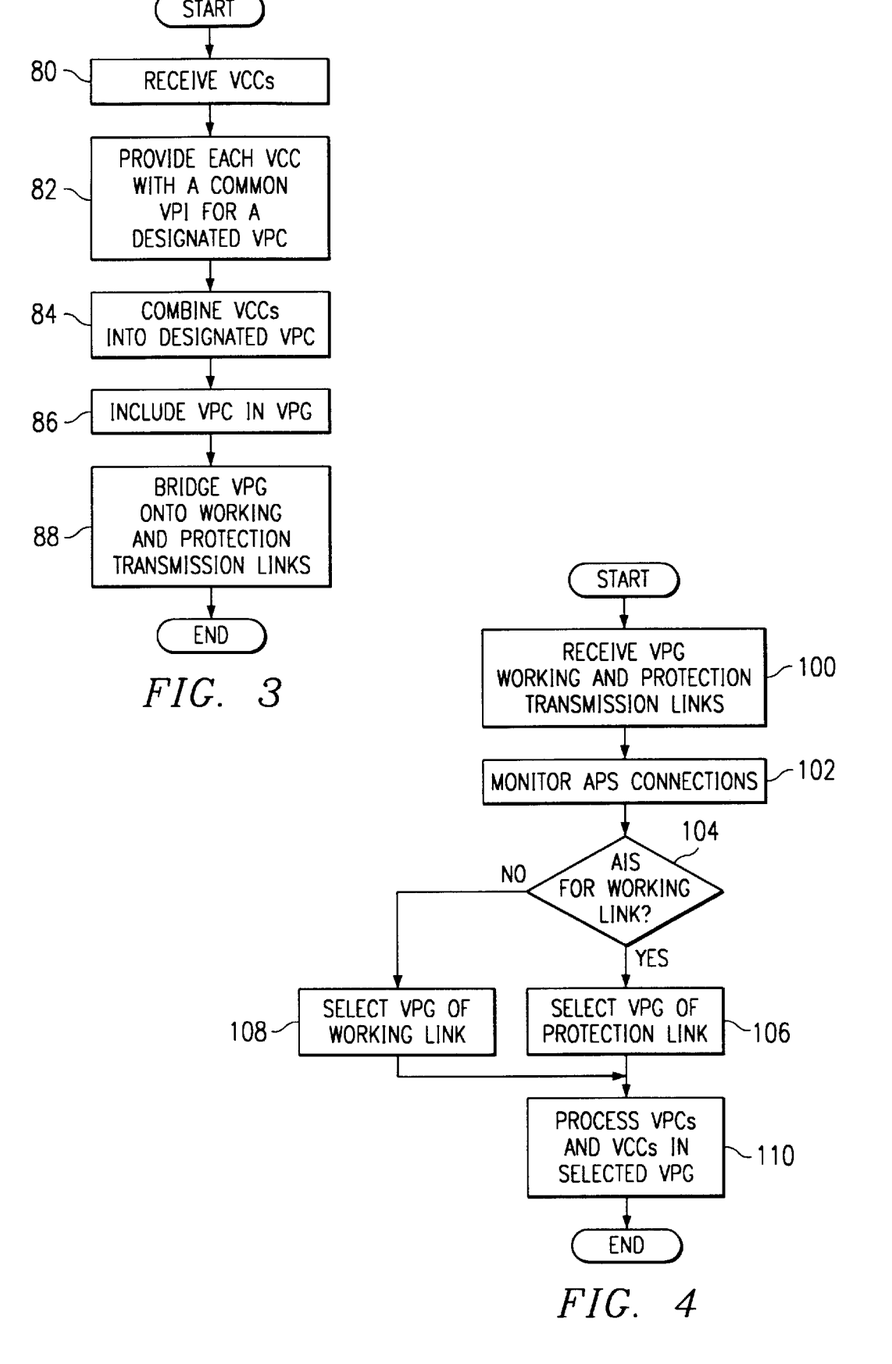
FIG. 3 is a flow diagram illustrating a method for transmitting virtual channel connections (VCCs) onto working and protecting transmission links in accordance with one embodiment of the present invention.
FIG. 4 is a flow diagram illustrating a method for protection switching of virtual channel connections (VCCs) in accordance with one embodiment of the present invention.

FIG. 3 is a flow diagram illustrating a method for transmitting virtual channel connections (VCCs) 36 onto working and protection transmission links 44 and 46 in accordance with one embodiment of the present invention. In this embodiment, the virtual channel connections (VCCs) 36 are combined into a virtual path connection (VPC) 38 which is then included in a virtual path group (VPG) 40 for transmission over a protected domain to a destination node 34. It will be understood that the virtual path connection (VPC) 38 containing the virtual channel connections (VCCs) 36 may be otherwise suitably transmitted without inclusion in the virtual path group (VPG) 40.

Referring to FIG. 3, the method begins at step 80 in which virtual channel connections (VCCs) 36 are received at the source node 30. Next, at step 82, virtual channel connections (VCCs) 36 of a specified type are each provided with a common virtual path identifier (VPI) for a designated virtual path connection (VPC) 38. The specified type may be those of a particular user or group of users, service category or other suitable characteristic that are together traversing the protection domain defined between the source and destination nodes 30 and 34. Provision of the common virtual path identifier (VPI) is provided by the ATM switch fabric 68 in accordance with programmed switching instructions.

Proceeding to step 84, the virtual channel connections (VCCs) 36 including the common virtual path identifier (VPI) are combined into the designated virtual path connection (VPC) 38. The virtual channel connections (VCCs) 36 may be combined into the designated virtual path connection (VPC) 38 by bundling, tunneling, multiplexing, or any other suitable process. At step 86, the virtual path connection (VPC) 38 is included by itself or with other traffic in a virtual path group (VPG) 40 for transmission over the protected domain.

Proceeding to step 88, the virtual path group (VPG) 40 including the virtual path connection (VPC) 38 and the included virtual channel connections (VCCs) 36 are bridged onto the working and protection transmission links 44 and 46 to allow protection switching at the destination node 34. Step 88 leads to the end of the process by which virtual channel connections (VCCs) 36 are packaged in a virtual path connection (VPC) 38 for transmission on working and protection links 44 and 46 and switching between the links. Packaging of the virtual path connection (VPC) 38 into the virtual path group (VPG) 40 may be omitted.

FIG. 4 is a flow diagram illustrating a method for protection switching of virtual channel connections (VCCs) 36 in accordance with one embodiment of the present invention. In this embodiment, the virtual path connections (VPCs) 38 containing the virtual channel connections (VCCs) 36 are transmitted within the virtual path group (VPG) 40. It will be understood that the virtual path connection (VPC) 38 may be independently transmitted by the source node 30 and processed by the destination node 34.

Referring to FIG. 4, the method begins at step 100 in which the virtual path group (VPG) 40 is received at the destination node 34 on both the working and protection transmission paths 44 and 46. As previously described, the virtual path group (VPG) 40 includes the virtual path connection (VPC) 38 and its included virtual channel connections (VCCs) 36.

Proceeding to step 102, the destination node 34 monitors the automatic protection switching (APS) virtual path connections (VPC) 45 for the working and protection transmission links 44 and 46. At decisional step 104, the destination node determines whether an alarm indication signal (AIS) has been received for the working transmission link. As previously discussed, an alarm indication signal (AIS) indicates failure or other type of problem on the working link 44.

Accordingly, if an alarm indication signal (AIS) has been received for the working transmission link 44, the Yes branch of decisional step 104 leads to step 106 in which the virtual path (VP) selector 48 selects the virtual path group (VPG) 40 from the protection transmission link 46. If an alarm indication signal (AIS) has not been received for the working transmission link 44, the No branch of decisional step 104 leads to step 108. At step 108, the virtual path (VP) selector 48 selects the virtual path group (VPG) 40 of the working transmission link by default. Selection of the virtual path group (VPG) 40 on either the working or protection transmission link 44 or 46 automatically selects the included virtual path connections (VPC) 38 and virtual channel connections (VCCs) 36. Accordingly, protection switching for virtual channel connections (VCCs) 36 is conducted at the virtual path connection (VPC) 38 or higher level.

Proceeding to step 110, the destination node 34 processes the virtual path connections (VPCs) 38 in the selected virtual path group (VPG) 40. In processing the virtual path connections (VPCs) 38, the destination node 34 processes the included virtual channel connections (VCCs) 36. Step 110 leads to the end of the process by which virtual channel connections (VCCs) 36 are bundled together into a virtual path connection (VPC) 38 that is protection switched as a unit in response to transmission line failure. It will be understood that the method and system of the present invention may be used to provide a protection architecture for other suitable types of virtual constructs in a telecommunications or other suitable system.

Although the present invention has been described with several embodiments, various changes and modifications may be suggested to one skilled in the art. It is intended that the present invention encompass such changes and modifications as fall within the scope of the appended claims.

What is claimed is:

1. A method for protecting virtual channel connection (VCC) traffic in a telecommunications system, comprising:
   receiving at a destination node a virtual path connection (VPC) on each of a working transmission link and a protection transmission link, the virtual path connection (VPC) including a plurality of virtual channel connections (VCCs);
   receiving a protection switching status for each of the working and protection transmission links; and
   selecting the virtual channel connections (VCCs) from the working and protection transmission links for processing by selecting the virtual path connection (VPC) from one of the working and protection transmission links based on the protection switching status for at least one of the working and protection transmission links.

2. The method of claim 1, further comprising selecting the virtual path connection (VPC) from the protection transmission link in response to receiving an alarm indication signal (AIS) for the working transmission link.

3. The method of claim 1, further comprising:
   receiving at the destination node a virtual path group (VPG) on each of the working and protection transmission links, the virtual path group (VPG) including the virtual path connection (VPC); and
   selecting the virtual path connection (VPC) from the working and protection transmission links by selecting the virtual path group (VPG) from one of the working and protection transmission links based on the protection switching status for at least one of the working and protection transmission links.

4. The method of claim 3, further comprising selecting the virtual path group (VPG) from the protection transmission link in response to receiving an alarm indication signal (AIS) for the working transmission link.

5. The method of claim 1, further comprising:
   receiving a working automatic protection switching (APS) virtual path connection (VPC) providing the protection switching status for the working transmission link; and
   receiving a protection automatic protection switching (APS) virtual path connection (VPC) providing the protection switching status for the protection transmission link.

6. The method of claim 5, further comprising selecting the virtual path connection (VPC) from the protection transmission link in response to receiving an alarm indication signal (AIS) on the working automatic protection switching (APS) virtual path connection (VPC).

7. The method of claim 1, further comprising:
   at a source node, receiving the plurality of virtual channel connections (VCCs);
   providing each of the virtual channel connections (VCCs) with a common virtual path interface (VPI) designation the virtual path connection (VPC);
   combining the virtual channel connections (VCCs) into the virtual path connection (VPC); and
   bridging the virtual path connection (VPC) onto the working and protection transmission links for transmission to the destination node.

8. The method of claim 7, further comprising:
   at the source node, including the virtual path connection (VPC) in a virtual path group (VPG);
   bridging the virtual path group (VPG) onto the working and protection transmission links for transmission to the destination node;
   at the destination node, receiving the virtual path group (VPG) on each of the working and protection transmission links; and
   selecting the virtual path connection (VPC) from the working and protection transmission links by selecting the virtual path group (VPG) from one of the working and protection transmission links based on the protection switching status for at least one of the working and protection transmission links.

9. The method of claim 7, combining the virtual channel connections (VCCs) into the virtual path connection (VPC) comprising multiplexing the virtual channel connections (VCCs) into the virtual path connection (VPC).

10. A telecommunications node, comprising:
    a virtual path (VP) selector comprising software stored on a computer-readable medium, the virtual path selector operable to receive on each of a working transmission link and a protection transmission link a virtual path connection (VPC) including a plurality of virtual channel connections (VCCs), to receive a protection switching status for each of the working and protection transmission links, and to select the virtual channel connections (VCCs) from the working and protection transmission links for processing by selecting the virtual path connection (VPC) from one of the working and protection transmission links based on the protection switching status for at least one of the working and protection transmission links; and
    an asynchronous transfer mode (ATM) cross-connect operable to receive and process the virtual channel connections (VCCs) selected by the virtual path (VP) selector.

11. The telecommunications node of claim 10, the virtual path (VP) selector further operable to select the virtual path connection (VPC) from the protection transmission link in response to receiving an alarm indication signal (AIS) for the working transmission link.

12. The telecommunications node of claim 10, the virtual path (VP) selector further operable to receive on each of the working and protection transmission links a virtual path group (VPG) including the virtual path connection (VPC) and to select the virtual path connection (VPC) from the working and protection transmission links by selecting the virtual path group (VPG) from one of the working and protection transmission links based on the protection switching status for at least one of the working and protection transmission links.

13. The telecommunications node of claim 12, the virtual path (VP) selector further operable to select the virtual path group (VPG) from the protection transmission link in response to receiving an alarm indication signal (AIS) for the working transmission link.

14. The telecommunications node of claim 10, the virtual path (VP) selector further operable to receive a working automatic protection switching (APS) virtual path connection (VPC) providing the protection switching status for the working transmission link and a protection automatic protection switching (APS) virtual path connection (VPC) providing the protection switching status for the protection transmission link.

15. The telecommunications node of claim 14, the virtual path (VP) selector further operable to select the virtual path connection (VPC) from the protection transmission link in response to receiving an alarm indication signal (AIS) on the working automatic protection switching (APS) virtual path connection (VPC).

16. A telecommunications system, comprising:
   a working transmission link and a protection transmission link each connecting a source node and a destination node;
   the source node including an asynchronous transfer mode (ATM) switch fabric comprising software stored on a computer-readable medium, the asynchronous transfer mode (ATM) switch fabric operable to receive a plurality of virtual channel connections (VCCs), provide each of the virtual channel connections (VCCs) with a virtual path identifier (VPI) for a virtual path connection (VPC), combine the virtual channel connections (VCCs) into the virtual path connection (VPC), and bridge the virtual path connection (VPC) onto the working and protection transmission links for transmission to the destination node; and
   the destination node including a virtual path (VP) selector comprising software stored on a computer-readable medium, the virtual path selector operable to receive the virtual path connection (VPC) on each of the working and protection transmission links, to receive a protection switching status for each of the working and protection transmission links, and to select the virtual channel connections (VCCs) from the working and protection transmission links for processing by selecting the virtual path connection (VPC) from one of the working and protection transmission links based on the protection switching status for at least one of the working and protection transmission links.

17. The telecommunications system of claim 16, further comprising:
   the asynchronous transfer mode (ATM) switch fabric further operable to include the virtual path connection (VPC) in a virtual path group (VPG) and bridge the virtual path group (VPG) onto the working and protection transmission links for transmission to the destination node; and
   the virtual path (VP) selector further operable to receive the virtual path group (VPG) on each of the working and protection transmission links and to select the virtual path connection (VPC) from the working and protection transmission links by selecting the virtual path group (VPG) from one of the working and protection transmission links based on the protection switching status for at least one of the working and protection transmission links.

18. The telecommunications system of claim 17, the virtual path (VP) selector further operable to select the virtual path group (VPG) from the protection transmission link in response to receiving an alarm indication signal (AIS) for the working transmission link.

19. The telecommunications system of claim 16, further comprising:
   a working automatic protection switching (APS) virtual path connection (VPC) providing the protection switching status for the working transmission link to the destination node;
   a protection automatic protection switching (APS) virtual path connection (VPC) providing the protection switching status for the protection transmission link to the destination node; and
   the virtual path (VP) selector further operable to select the virtual path connection (VPC) from the protection transmission link in response to receiving an alarm indication signal (AIS) on the working automatic protection switching (APS) virtual path connection (VPC).

20. The telecommunications system of claim 16, the asynchronous transfer mode (ATM) switch fabric further comprising a multiplexer operable to multiplex the virtual channel connections (VCCs) into the virtual path connection (VPC).

* * * * *

UNITED STATES PATENT AND TRADEMARK OFFICE
CERTIFICATE OF CORRECTION

PATENT NO.    : 6,353,593 B1
DATED         : March 5, 2002
INVENTOR(S)   : David X. Chen et al.

It is certified that error appears in the above-identified patent and that said Letters Patent is hereby corrected as shown below:

Title page,
Item [56], References Cited, OTHER PUBLICATIONS, after "w.mmcnet.com/ Solutions/anyflow" delete "5400" and insert -- 5500 --.

Column 1,
Line 55, after "(VCG)", insert -- . --.

Column 5,
Line 41, after "connections", delete "(VCCS)" and insert -- (VCCs) --.

Signed and Sealed this

Twenty-first Day of January, 2003

JAMES E. ROGAN
*Director of the United States Patent and Trademark Office*